US006463907B1

United States Patent
Hiltner

(10) Patent No.: US 6,463,907 B1
(45) Date of Patent: Oct. 15, 2002

(54) HOMOGENEOUS CHARGE COMPRESSION IGNITION DUAL FUEL ENGINE AND METHOD FOR OPERATION

(75) Inventor: Joel D. Hiltner, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/663,087

(22) Filed: Sep. 15, 2000

Related U.S. Application Data

(60) Provisional application No. 60/153,935, filed on Sep. 15, 1999.

(51) Int. Cl.⁷ .............................................. F02M 43/00
(52) U.S. Cl. ..................................... 123/304; 123/27 R
(58) Field of Search .............................. 123/304, 27 R, 123/525, 294

(56) References Cited

U.S. PATENT DOCUMENTS

| | | | |
|---|---|---|---|
| 3,144,857 A | | 8/1964 | Hesselberg |
| 3,577,877 A | | 5/1971 | Hai |
| 3,915,134 A | | 10/1975 | Young et al. |
| 5,140,959 A | * | 8/1992 | Durbin ........................ 123/304 |
| 5,355,854 A | | 10/1994 | Aubee |
| 5,479,906 A | * | 1/1996 | Collie ......................... 123/304 |
| 5,487,362 A | | 1/1996 | Wellev et al. |
| 5,499,615 A | | 3/1996 | Lawrence et al. |
| 5,526,786 A | | 6/1996 | Beck et al. |
| 5,537,824 A | | 7/1996 | Gustafson et al. |
| 5,623,909 A | | 4/1997 | Wertheimer |
| 5,749,334 A | | 5/1998 | Oda et al. |
| 5,794,585 A | * | 8/1998 | Yonezawa et al. ........... 123/278 |
| 5,832,880 A | | 11/1998 | Dickey |
| 6,029,623 A | * | 2/2000 | Weissman et al. .......... 123/304 |
| 6,032,617 A | * | 3/2000 | Willi et al. .................. 123/304 |

* cited by examiner

Primary Examiner—John Kwon
(74) Attorney, Agent, or Firm—Michael B. McNeil

(57) ABSTRACT

A Homogenous Charge Compression Ignition (HCCI) engine and operating method having ignition timing controlled on a cycle to cycle basis by adding to a primary fuel, which is typically greater than 95% and is a gas such as natural gas with a relatively slow burn rate, varying amounts of high cetane number fuel, typically diesel fuel, before or early in the compression stroke. The amount of high cetane fuel that is injected depends on engine speed and load, and is selected to insure that combustion is phased properly with crankshaft position. The ignition delay is thus controlled substantially independently of the burn duration, which is controlled by varying the amount of Exhaust Gas Recirculation (EGR) in conjunction with the air to fuel ratio so as to maintain a near constant crank angle burn duration over a wide range of engine speeds. Because of the relatively slow burn rate of the natural gas after ignition, relatively low EGR levels and high boost levels are practical with the subject HCCI engine so that its power density is greater than that of previous HCCI engines. The load and speed of the subject HCCI engine may be controlled over a wide range by varying the overall air to fuel ratio or the boost pressure. The high cetane liquid fuel may be injected together with the gas and early in the compression stroke so that the gas atomizes the liquid upon injection.

22 Claims, 3 Drawing Sheets

Fig_1_

HOMOGENEOUS CHARGE COMPRESSION IGNITION DUAL FUEL ENGINE AND METHOD FOR OPERATION

This application claims the benefit of U.S. Provisional application No. 60/153,935, filed Sep. 15, 1999.

TECHNICAL FIELD

The present invention relates to an internal combustion engine operating with a homogeneous charge of combined gaseous and liquid fuel ignited by compression. The present invention further relates to such an engine where exhaust gas is used with the combustible mixture and where gaseous fuel may be used to inject liquid fuel.

BACKGROUND OF THE INVENTION

Current production engines include diesel engines; engines with a homogeneous charge ignited at a particular location as by a spark; and lean burn, spark ignited engines where a locally rich mixture is ignited and provides ignition of an overall lean mixture. These engines are all limited in the maximum efficiency that can be achieved at a given level of emission of nitrogen oxides (NOx) because of the high temperature that is produced in the zone where combustion occurs. In these engines, efficiency is improved by increasing the mean combustion temperature, but this pushes the temperature in the combustion zone into the range in which NOx is generated. This is the case in both the diffusion flame front of a diesel, where the rate of mixing determines the rate of combustion, and in a propagating flame front where the flame travels through a homogeneous or lean charge from a point of ignition. The operation of the above engines will be briefly described as background for Homogenous Charge Compression Ignition (HCCI) engines including HCCI engines embodying the present invention.

More particularly and in diesel engines, only air, with a greater of less admixture of exhaust gas, is compressed in the cylinder, and combustion of a liquid fuel is initiated by heat of compression when fuel is first injected. This combustion continues as the rest of the fuel is injected and oxygen from the air mixes therewith. Conceptually, the same amount of gas is always compressed and, when greater power is required, more fuel is added by injecting fuel over a longer period of time. The efficiency of diesel engines is relatively high because of the high compression ratio, particularly at less than full power where the overall fuel to air ratio is very lean and because the flow of intake gas to the cylinder is not restricted.

It is apparent that, in diesel engines, the fuel should ignite as soon as injection begins; and the cetane number, by which diesel fuels are rated, is a measure of the ease of ignition, a higher cetane number indicating greater ease of ignition.

In the homogeneous charge and lean burn engines, evaporated liquid or gaseous fuel is mixed in an approximately stoichiometric ratio with air before or shortly after the air is provided to the cylinder; the mixture is compressed; and combustion is initiated by ignition, typically by an electric spark, at a point from which the flame front propagates. It is evident that in these engines the fuel should not ignite by compression until the spark occurs so that the fuels used in these engines are relatively difficult to ignite and thus would have a low cetane number. In conventional homogeneous charge engines, the power is controlled by restricting the amount of air provided to the cylinder and varying the amount of fuel provided correspondingly.

It is known to provide a dual fuel variation of the homogeneous charge engine, for example as described in U.S. Pat. No. 3,144,857, which uses an approximately stoichiometric mixture of air and a gaseous primary fuel that can be highly compressed without ignition. This mixture is then ignited at a point, from which the flame front propagates, by a pilot injection of a relatively small amount of diesel fuel that is ignited by compression of the mixture.

It is apparent that, in all of these types of engines, the ignition and start of combustion can be controlled by selecting the point, as an angular position of a crankshaft, where the spark or fuel injection occurs. It is known in some engines of all of these types to employ Exhaust Gas Recirculation (EGR), in which a portion of the gas exhausted from the cylinder is mixed with air being provided to the cylinder. This is typically done to reduce emissions, and complex control arrangements are known for selecting the portion of exhaust gas recirculated in relation to engine load, speed, temperature, amount of oxygen in the exhaust, and the like; these arrangements also selecting related engine control factors such as the time and amount of fuel injected and the time of ignition.

In contrast to the above-described engines, Homogenous Charge Compression Ignition (HCCI) engines produce both very low emissions and diesel engine efficiencies by avoiding the high thermal gradients that are present in either a diffusion or a propagating flame front. In present HCCI engines, an evaporated liquid or a gaseous fuel is mixed with air before or shortly after the air is provided to the cylinder to form a homogenous charge; the mixture ignites as compression continues; and combustion occurs without a defined flame front since combustion is initiated throughout the combustion chamber and the rate of heat release is determined by the chemical reaction rate of the charge.

In HCCI engines, a charge having the same amount of air, with a greater of less admixture of exhaust gas, is always compressed in the cylinder and power is controlled by varying the amount of fuel added to and homogeneously mixed with the charge, with ignition and combustion of the lean mixtures being achieved by high compression ratio and recirculation of hot exhaust gas.

The rapid and homogenous burning possible with HCCI engines has, in concept, the potential to reduce exhaust emissions, retain diesel-like efficiency, and reduce engine cost, particularly in high speed engines. HCCI engines can greatly reduce the level of NOx emissions at a given efficiency due to the more uniform in-cylinder temperature distribution; and, because no flame front is present, the mean cylinder temperature of a HCCI engine is equal to that of a diesel engine without the peak temperature entering the NOx generation region as in the diesel and other engines described above.

HCCI engines should be less expensive to produce than diesel engines or lean burn spark ignited engines since HCCI engines do not necessarily require the high pressure oil system, including pump, distribution system, and injectors of a diesel and do not require the ignition system of a spark ignited engine with spark plugs, spark plug wires, and ignition coils, which offer serious durability problems on heavy duty engines.

Heretofore however, HCCI engines have not been practical because with the previously employed fuels—diesel or natural gas—and arrangements for using these fuels, HCCI engines operate over a limited range of loads and speeds and provide a very low power density—that is, produce a very low amount of power for the displacement and speed of such an engine. These limitations of HCCI engines have resulted from difficulties in controlling the ignition timing of the engine and in producing a long enough combustion event to prevent high peak cylinder pressures.

For the purposes of the present application, the terms "ignition timing" and "ignition delay" are related. Typically, ignition timing refers to the start of desired combustion in relation to a particular angle of crankshaft rotation; and ignition delay refers to the elapsed time before the start of combustion after such an angle, completion of injection of a fuel, or the like. Terms such as "burn duration", "duration of combustion", and length of "combustion event" refer to the elapsed time for combustion to be completed after the start of combustion, this elapsed time being measured absolutely or as an angle of crankshaft rotation.

The previously utilized method for selecting the ignition timing of a HCCI engine is by control of Exhaust Gas Recirculation (EGR). That is, the proportion of hot exhaust gas recirculated is increased and the proportion of air is reduced so that the cylinder temperature during compression is increased and ignition delay is shortened. However, the operating speed range of HCCI engines with such EGR control is inherently limited because increasing the EGR to shorten ignition delay lengthens the duration of the following combustion due to the lesser availability of oxygen.

As a result, at low speeds where longer ignition delays are acceptable because there is longer time between fuel injection and first indication of combustion, little EGR is needed to promote ignition, while high EGR levels are needed to lengthen the combustion once it has begun. Conversely, at higher speeds, where high levels of EGR are needed to accelerate the ignition process, these high levels lengthen the combustion period and so limit the maximum operating speed of the engine.

Diesel fueled HCCI engines have a very narrow range of operation and low levels of specific power output because diesel fuel has a short ignition delay, due to its very low autoignition temperature, which makes compression ignition very easy to achieve. However, this ease of ignition limits the range of fuel to air ratios to the very lean, and therefore slow to ignite, mixtures required to lengthen ignition delay to levels acceptable in HCCI engines. This limited range of mixtures and ignition delay limits the range of operation, and the lean mixtures limit the energy released and give low specific power output.

Even with these lean mixtures, however, diesel fuel burns rapidly once ignited; and this results in rapid pressure rise which is limited by the mechanically allowable cylinder pressure. As a result, boost pressure, such as provided by a turbocharger, must be restricted; and this further contributes to relatively low specific power output.

It is known, as in U.S. Pat. No. 5,832,880, to operate a diesel fueled HCCI engine with sufficient EGR to always ensure ignition and then inject water to delay the start of combustion, as determined by a sensor, to a desired time. It is apparent that the water makes combustion more difficult and, in effect, lowers the cetane number of the diesel fuel. As a result, the delay of combustion would be accompanied by longer burn duration so that and ignition delay and burn duration are not independently controlled.

Natural gas fueled HCCI engines have a very narrow range of operation and very low levels of specific power output because, while natural gas burns more slowly than diesel fuel and thus provides a more extended heat release duration and slower pressure rise, natural gas is more difficult to autoignite than diesel fuel so that very high levels of EGR must be used to produce compression temperatures at which natural gas will compression ignite in a reasonable period of time. These high levels of EGR limit the energy released, giving low specific power output. Also, these EGR levels lengthen the combustion duration that reduces the maximum speed at which the engine can be operated and thus limits both the specific power output and the operating range.

SUMMARY OF THE INVENTION

The present invention is a Homogenous Charge Compression Ignition (HCCI) engine which provides the above-described advantages of low emissions and high efficiency together with high power density, a wide range of operation, and reduced cost.

One aspect of the present invention is effective with an HCCI engine in which the primary fuel, typically greater than 95%, is a gas with a relatively slow burn rate, typically natural gas, and in which ignition timing is controlled by the addition thereto of varying amounts of a high cetane number fuel, typically diesel fuel, before or early in the compression stroke. The amount of high cetane fuel that is added depends on engine speed and load, and is selected to insure that the initiation of the combustion event is phased properly with crankshaft position.

The ignition timing is thus controlled substantially independently of the burn duration, which, in another aspect of the invention, is controlled substantially independently of the burn delay by varying the amount of Exhaust Gas Recirculation (EGR) which may be varied in conjunction with the fuel to air ratio.

In yet another aspect of the present invention, which independently controls the ignition delay and burn duration as before stated, the load and speed of a subject HCCI engine may be selected over a wide range by varying either the overall fuel to air ratio or the boost pressure or by varying these engine operating conditions together in any suitable manner.

In a further aspect of the present invention, as when it is utilized with a high cetane fuel such as diesel fuel or lubricating oil which is liquid and of low volatility, the gas and liquid fuel are injected together and early in the compression stroke when the cylinder pressure is relatively low. The gas injection atomizes the liquid without the need for the complex, high-pressure components required by a diesel engine and also provides increased turbulence during combustion.

More specifically in the present invention, the ignition delay is controlled by varying the cetane number of the overall fuel mixture, this number being higher for a more easily ignited fuel as before mentioned, by the addition of varying amounts of high cetane fuel to a primary low cetane fuel as by the above-described injection of varying amounts of the high cetane liquid fuel into the primary, gaseous low cetane fuel.

This control is effective because the cetane number of a fuel mixture can be varied by combining different ratios of two fuels; and, if a small amount of diesel fuel or other high cetane number fuel is combined with natural gas, the ignition delay of the mixture will vary in a predictable manner with the amount of cetane improver added. The ignition timing of a HCCI engine can thus be selected independently of either the amount of EGR or the overall fuel to air ratio. Further, when a controlled amount of the high cetane fuel is injected every cycle, this independent ignition timing of the HCCI engine can be varied on a cycle by cycle basis.

The use, in an HCCI engine and in accordance with the present invention, of varying amounts of high cetane fuel, such as diesel fuel, in combination with a low cetane fuel, such as natural gas as a primary fuel, offers at least four advantages over other HCCI engine arrangements and methods of operation. First and as just stated, the crank angle at which ignition occurs can be controlled on a cycle to cycle basis. Second and because ignition delay is controlled independently from the amount of EGR, varying levels of EGR can be used to maintain a near constant crank angle burn duration over a wide range of engine speeds. Third and because the cylinder temperature is largely uniform and the fuel to air ratio is not used to control ignition delay and is not necessarily used to control burn duration, the load range of the engine can be extended by operation over a range of lean mixtures. Fourth and because of the relatively slow burn rate of the low cetane fuel in comparison with the high cetane fuel, the power density of the engine is increased because lower EGR levels and higher boost levels are practical.

Further, an HCCI engine embodying the present invention is advantageous in relation to a lean burn, spark ignited engine because the lean limit is lower in the subject engine due to the added high cetane fuel contributing energy to combustion and because the lack of a propagating flame front significantly reduces burn duration. The fuel economy of the subject engine will thus be greater while the power density is increased and the engine cost is lowered by the absence of an ignition system.

DETAILED DESCRIPTION OF THE INVENTION

Figure 1:
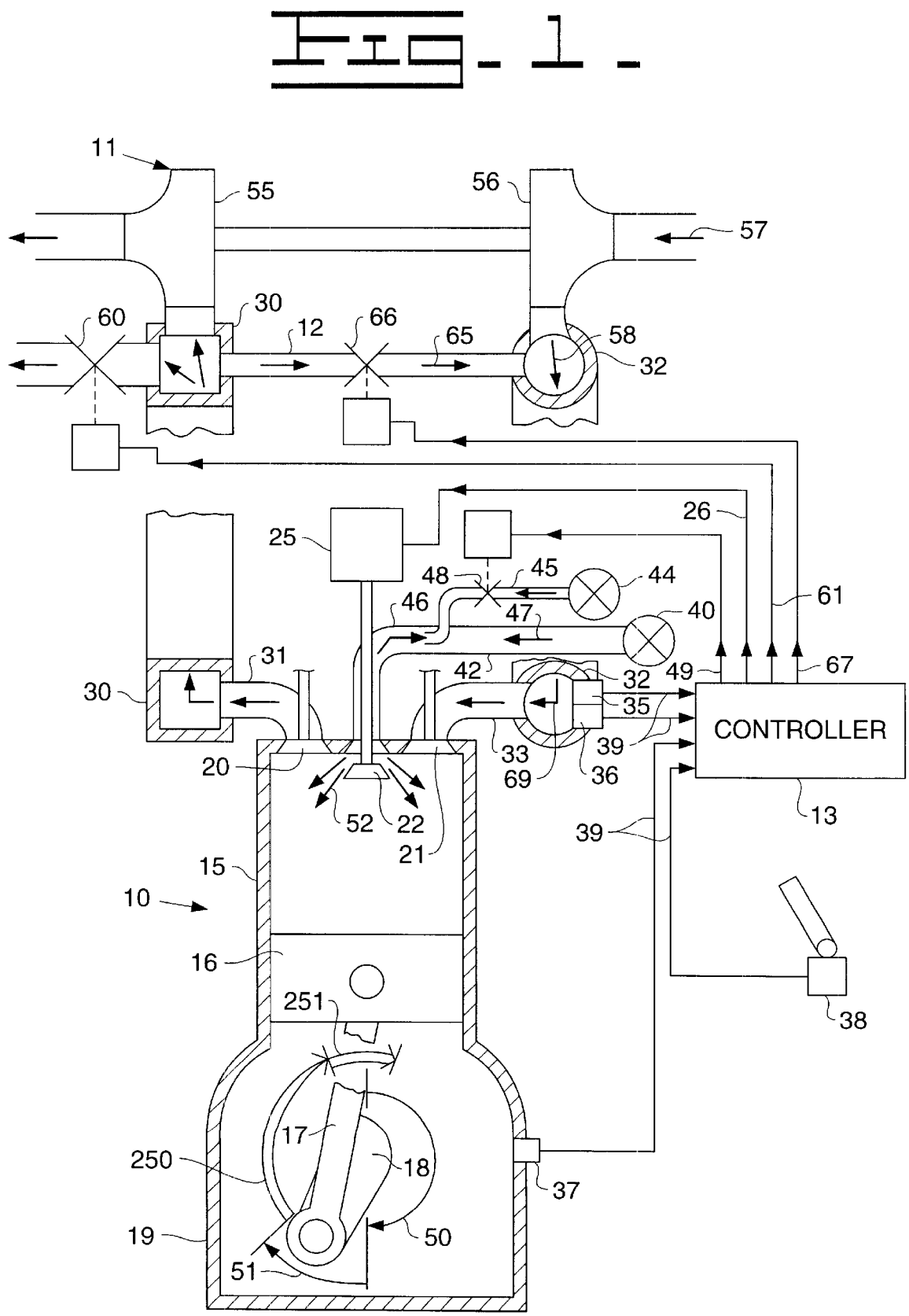
FIG. 1 is a conceptual diagram of a homogeneous charge, compression ignition, dual fuel engine and associated equipment which are a first embodiment of the present invention and are a representative operating environment for a method of operating the engine in accordance with the invention. The diagram includes a turbocharger and has portions of several elements broken away for illustrative convenience.

FIG. 1 shows a homogeneous charge, compression ignition, dual fuel internal combustion engine that is indicated generally by the numeral 10 and embodies the principles of the present invention. The engine is depicted with associated equipment, including a turbocharger 11, exhaust gas recirculation conduit 12, and any suitable controller 13 which typically includes a microprocessor. The engine and the equipment will be described in detail as a representative operating environment for a method also embodying the principles of the invention.

Engine 10 is represented as a four-stroke cycle, reciprocating engine having conventional mechanical elements although it will be apparent to one skilled in the art that the present invention is not restricted to such an engine or arrangement of elements. The engine includes a cylinder 15 in which a piston 16 reciprocates due to its connection by a connecting rod 17 with a crankshaft 18, which is rotationally received in a crankcase 19.

Cylinder 15, which is typically one of several similar cylinders included in the engine, has an exhaust valve 20, an inlet valve 21 for air and recirculated exhaust gas, and a fuel injection valve 22. Valves 20 and 21 are depicted without any specific elements for their actuation since these two valves may be operated by any suitable elements providing for cyclic operation of the cylinder. Fuel valve 22 is represented as a poppet valve having an actuator 25, which may be electrohydraulic and which opens and closes valve 20 at appropriate times in response to signals which are indicated by numeral 26 and are provide by controller 13. Engine 10 is depicted in a condition with valve 22 open and with piston 16 in a position in which the piston has started an upward, compression stroke. This condition and other cyclic conditions of the engine will be explained in greater detail in connection with a method of the present invention.

Engine 10 has an exhaust manifold 30 communicating with exhaust valve 20 through an exhaust port 31 and has an inlet manifold 32 communicating with valve 21 through an inlet port 33, these elements being of conventional construction and the manifolds also communicating with any additional cylinders of the engine. It is apparent that the exhaust valve is a device for releasing products of combustion from the cylinder and that the exhaust port and manifold 30 are passages for these products.

The inlet manifold has an inlet pressure sensor 35 and an inlet temperature sensor 36. The engine 10 is represented as having a sensor 37 for sensing both the rotational position and the rotational speed of the crankshaft and a sensor 38 for indicating selecting a desired power output of the engine. Signals from these sensors are provided to controller 13 as indicated by numeral 39. These signals are representative of input signals from which the controller derives, in accordance with principles and algorithms which will be apparent to those skilled in the art of internal combustion engine control, output signals for operation of the engine. Representative such output signals involved in the present invention, which include signals 26, will be subsequently described.

Engine 10 is provided with a source, indicated by numeral 40, of a pressurized, gaseous fuel, such as natural gas, having a relatively low cetane number. A gaseous fuel conduit 42 leads from this source to fuel inlet valve 22. The engine is also provided with a source, indicated by numeral 44, of a pressurized, liquid fuel, such as diesel fuel, having a relatively high cetane number. A liquid fuel conduit 45 leads from source 44 into conduit 42 and terminates therein so as to spray the liquid fuel, as indicated by numeral 46, into gaseous fuel flowing to valve 22 in conduit 42 as indicated by arrow 47. The flow of liquid fuel is determined by a valve 48 disposed in conduit 45 and actuated by signals, which are indicated by numeral 49 and are provided by controller 13.

It will be apparent that valve 21 which, as before mentioned is for air and recirculated exhaust gas, is a first inlet device for admitting a gaseous medium containing oxygen to cylinder 15 and that port 33 and manifold 32 are inlet passages for conducting this medium to valve 21. It is also apparent that conduit 47 and valve 22 are second inlet devices for providing the relatively low cetane number, gaseous fuel to the cylinder and that conduit 45 and valve 48 are third inlet devices for providing the relatively high cetane number, liquid fuel to the cylinder.

It is evident that valve 21 is actuatable to admit such a gaseous medium containing oxygen to the cylinder during a crankshaft rotation angle which is indicated by numeral 50 and is, conceptually, the intake stroke of a four stroke cycle. Angle 50 is sometimes referred to in the claims as a "first crankshaft rotation angle". After this angle, fuel valve 22 is opened by actuator 25 so that, during a crankshaft rotation angle, which follows angle 50 and is indicated by numeral 51, the fuel valve provides the gaseous fuel directly into the cylinder as indicated by arrows 52. Angle 51 is sometimes referred to in the claims as a "third crankshaft rotation angle".

The opening and closing of valve 22 may selected by controller 13 so as to vary the fuel to air ratio in the cylinder. As the gaseous fuel is so provided to the cylinder, valve 48 and conduit 45 provide the liquid fuel into the gaseous fuel and therewith into the cylinder. This introduction of the liquid fuel may be controlled by valve 48 so as to occur during an angle, which is sometimes referred to in the claims as a "fourth crankshaft rotation angle" and which is not indicated but may be any portion of the angle 51 so as to vary the ratio of the liquid and gaseous fuels for purposes subsequently described.

In the embodiment of the present invention depicted in FIG. 1, the gaseous fuel is provided by source 40 at a pressure greater than the pressure being developed in cylinder 15 during the compression stroke which, conceptually, begins when valve 21 closes after angle 50. As a result, the gaseous fuel is injected by its pressure into the cylinder during angle 51 when valve 22 is open. This pressure may be on the order of 200 psi and is thus substantially less than the final compression pressure attained during the compression stroke. Source 44 supplies the liquid fuel a sufficiently higher pressure than the gaseous fuel supplied by source 40 so that the conduit 45 adds the liquid fuel into the gaseous at conduit 42 and so that the liquid fuel is injected into the cylinder together with the gaseous fuel and as also indicated by arrows 52.

In FIG. 1, exhaust manifold 30 and intake manifold 32, where portions thereof are broken away for illustrative convenience, extend from engine 10 to turbocharger 11 which is conventionally represented with a turbine 55, which is driven by combustion products from manifold 30. These products enter manifold 30 from cylinder 15 through valve 20 which is, as before stated, conventionally actuated by any suitable elements to release the products from the cylinder during a crankshaft rotation angle, sometimes referred to in the claims as a "second crankshaft rotation angle" corresponding to the exhaust stroke of a four-stroke cycle.

Turbine 55 rotationally drives a compressor 56 that compresses a flow of ambient air indicated by arrow 57 into intake manifold 32 as indicated by arrow 58. The compressor is thus a supercharger which increases the amount of the gaseous medium containing oxygen provided to cylinder 15 at each cycle where such medium is provided during rotation of crankshaft 18 through angle 50.

Turbocharger 11 includes a wastegate 60 which is actuated by controller 13 through signals indicated by numeral 61 and which bypasses products of combustion from manifold 30 around turbine 55 so that less air is compressed by compressor 56. The turbocharger is thus controllable to increase or decrease the amount of air provided to cylinder 15, the power provided by the engine at each cycle being increased when the amount of air is increased and corresponding amounts of fuel from sources 40 and 44 are injected through valve 22.

Also and when turbocharger 11 is providing the same amount of air to cylinder 15 at each cycle, the power provided by engine 10 may be varied by controlling valves 22 and 48 to select the amounts of gaseous and liquid fuels provided with the air and thus determine the fuel to air ratio in the cylinder and, therefore, the power developed at each cycle.

Exhaust gas recirculation conduit 12 interconnects manifolds 30 and 32 for flow of hot exhaust gases from manifold 30 to manifold 32 as indicated by arrows 65. Conduit 12 has an exhaust gas recirculation control valve 66 which is actuated by controller 13 through signals indicated by numeral 67 to select a portion of the products of combustion from manifold 30 for recirculation to manifold 32 and mixing therein with air provided by compressor 56 to form the above-identified gaseous medium containing oxygen, this medium entering cylinder 15 as indicated by numeral 69.

Figure 2:
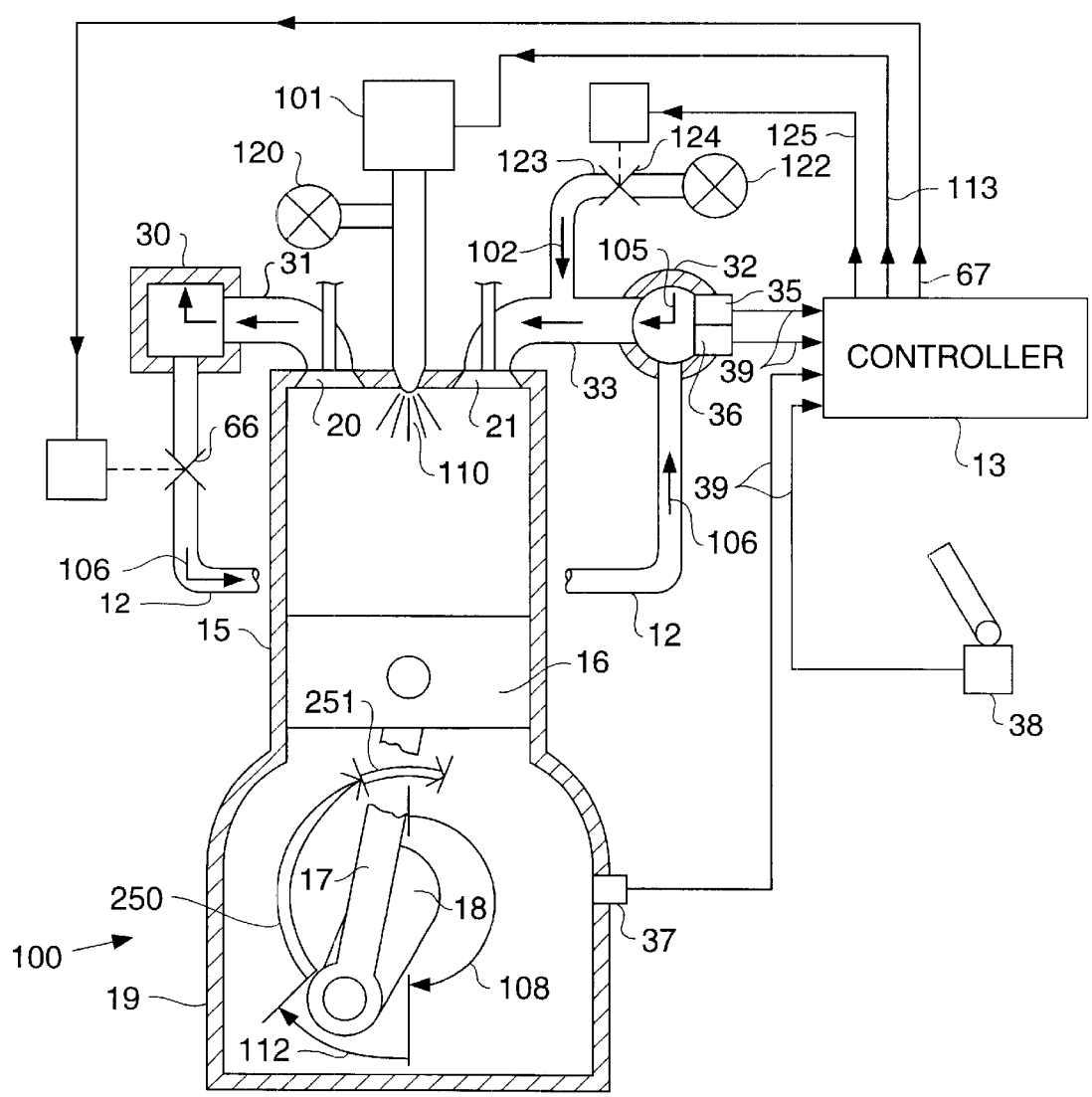
FIG. 2 is a diagram of such an engine and equipment which are a second-embodiment of the present invention and are another operating environment for a method thereof.

Referring now to FIG. 2 where elements substantially the same as those in FIG. 1 are identified by the same numerals, it is seen that the principal differences between the engine 10 of FIG. 1 and the homogeneous charge, compression ignition, dual fuel internal combustion engine of FIG. 2, which is indicated generally by the numeral 100 and is a further embodiment of the principles of the present invention, is the absence of a turbocharger in FIG. 2 and the injection of the liquid, relatively high cetane fuel directly into the cylinder 15 by a fuel injector 101. Also in engine 100, the gaseous, relatively low cetane fuel is provided into inlet port 33, as indicated by arrow 102, and admitted to the cylinder through valve 21 together with the above-identified gaseous medium containing oxygen which is a mixture of air, indicated by numeral 105 and recirculated combustion products indicated by numeral 106. It will be apparent that this FIG. 2 arrangement of liquid and gaseous fuel supply may also be employed with a turbocharger and controls similar to elements 11 and 60 of FIG. 1.

This admission of gaseous fuel, air and combustion products occurs during the crankshaft angle 108 which is like the angle 50 in FIG. 1 in that inlet valve 21 is open. During this angle, the gaseous fuel is provided to port 33 by conduit 123 and valve 124. When the inlet valve closes following angle 108, injector 101 injects the liquid fuel directly into cylinder 15, as indicated by numeral 110, during a crankshaft angle 112 selected by controller 103 and determined by signals, which are indicated by numeral 113, to the injector which may be of any suitable construction and may be electrohydraulically actuated.

Other features shown in FIG. 2 that are significantly different from those in FIG. 1 are the presence in FIG. 2 of any suitable source 120 of diesel fuel for injector 101 and a source 122 of the gaseous fuel. The latter source may provide the gaseous fuel through a conduit 123 at a substantially lower pressure than the FIG. 1 source 40 since the gaseous fuel in FIG. 2 is not injected against the compression pressure in cylinder 15, but enters with the other gases from manifold 32. Conduit 123 is provided with a valve 124 actuated from controller 103 by signals, indicated by numeral 125, to select the amount of the gaseous fuel admitted during each cycle and thereby control the fuel to air ratio in the cylinder and, as a result, the power developed at each cycle therein. The ratio of liquid fuel to gaseous fuel may be selected in accordance with the principles of the present invention by controlling liquid fuel injector 101 in conjunction with gaseous fuel valve 124.

Figure 3:
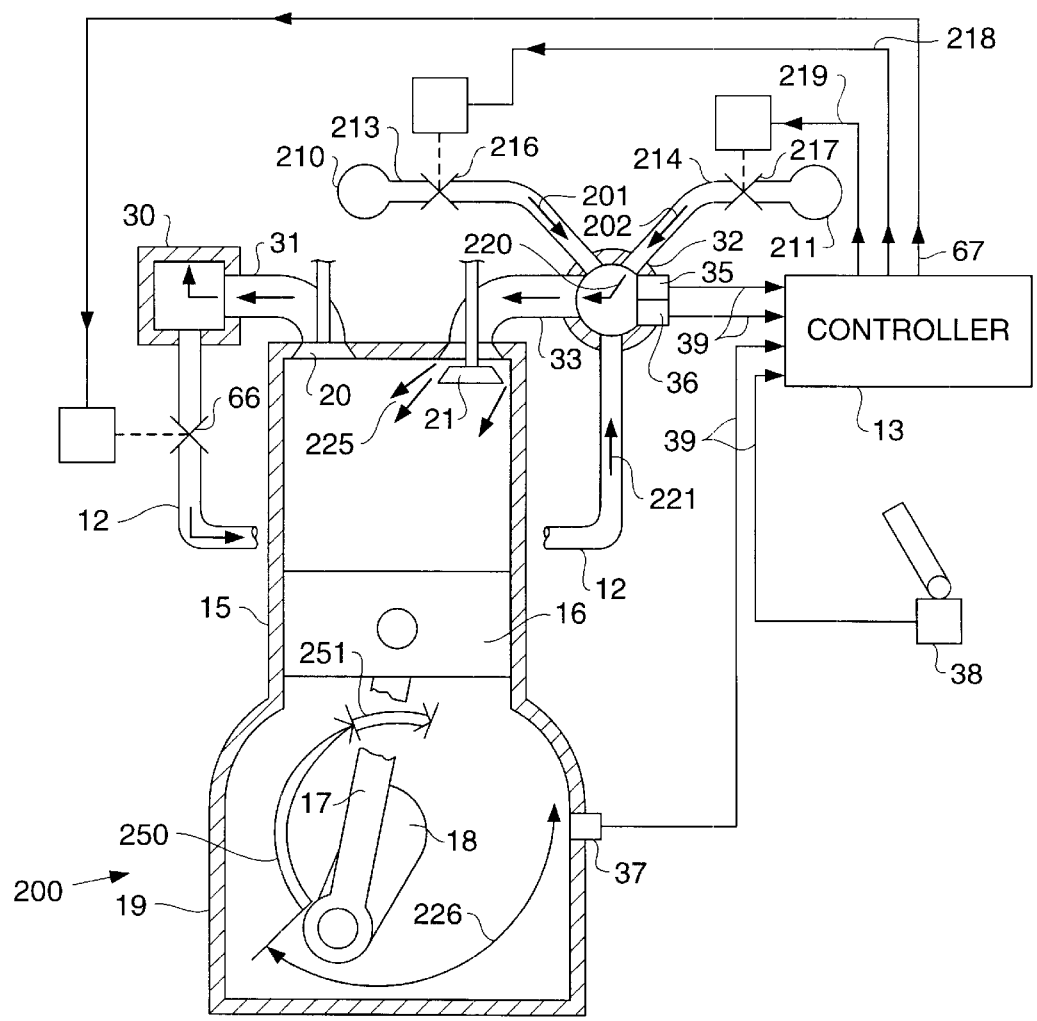
FIG. 3 is a diagram of such an engine and equipment which are a third embodiment of the present invention and are a further operating environment for a method thereof.

Referring now to FIG. 3 where elements substantially the same as those in FIGS. 1 and 2 are identified by the same numerals, it is seen that the principal differences between the engines 10 of FIG. 1 and 100 of FIG. 2 and the homogeneous charge, compression ignition, dual fuel internal combustion engine of FIG. 3, which is indicated generally by the numeral 200 and is a third embodiment of the principles of the present invention, is the absence of a turbocharger, as in FIG. 2, and the provision of the relatively high cetane fuel, which is not necessarily liquid, into intake manifold 32 as indicated by arrow 201 with the relatively low cetane fuel, which is not necessarily gaseous, also provided being provided into the intake manifold as indicated by arrow 202.

To supply such fuels, the depicted engine 200 has any suitable source 210 for the high cetane fuel and a source 211 of the low cetane fuel. Sources 210 and 211 are connected to intake manifold by respective conduits 213 and 214 having corresponding valves 216 and 217 respectively actuated by controller 13 through signals identified by numerals 218 and 219. Sources 210 and 211 may supply the fuels at relatively low pressures although it will be apparent that an engine similar to engine 200 and also embodying the principles of the present invention may use any other suitable arrangement such as relatively low pressure injection of either fuel into manifold 32 or port 33. It will also be apparent that the described FIG. 3 fuel supply arrangements may also be employed with a turbocharger and controls similar to elements 11 and 60 of FIG. 1.

When inlet valve 21 is actuated to the depicted open position shown in FIG. 3, air indicated by arrow 220, recirculated combustion products indicated by numeral 221, and the fuels indicated by arrows 201 and 202 enter the intake manifold and are mixed therein to enter cylinder 15 as indicated by arrows 225. This admission occurs during a crankshaft angle indicated by numeral 226 which is like the angle 50 in FIG. 1 in that inlet valve 21 is open.

It is evident that valve 21 admits a gaseous medium containing oxygen to the cylinder. It is also evident that conduit 214 and valve 217 are second inlet devices for providing a relatively low cetane number fuel to port 33 and thus to cylinder 15, and that conduit 213 and 216 are a third inlet devices for providing a relatively high cetane number fuel through this port to the cylinder.

In engine 200, valves 216 and 217 are controlled to select the amounts of the high and low cetane fuels with admitted to the cylinder through valve 21 together with the above-identified gaseous medium containing oxygen which is a mixture of air, indicated by numeral 220 and recirculated combustion products indicated by numeral 221. The total amounts of the fuels may be thus be selected to control the fuel to air ratio in the cylinder and, as a result, the power developed at each cycle therein while the ratio of the high cetane fuel to the gaseous fuel is selected in accordance with principles of the present invention shortly to be explained.

Operation

The operation of engines 10, 100, and 200 to carry out a method of operating a homogeneous charge, compression ignition, dual fuel engine in accordance with the present invention is substantially the same following the respective angles 50 and 51, 108 and 112, and 226. During these angles a generally homogeneous, combustible mixture of air, recirculated combustion products, low cetane fuel, and high cetane fuel is provided as a charge to cylinder 15. Piston 16 then compresses the charge in the cylinder during an ignition delay period, which corresponds to a crankshaft rotation angle represented in the Figures by a double line arrow indicated by numeral 250, until the charge ignites by compression generally simultaneously at a plurality of locations distributed throughout the charge. The charge then burns during a combustion period following the ignition delay period, this combustion period corresponding to a crankshaft rotation angle indicated by numeral 251.

In accordance with the present invention and as discussed above, the ignition delay 250 is controlled by varying the ratio of the high cetane fuel to the low cetane fuel, the ignition delay being shortened by decreasing the ratio of the amount of the low cetane fuel to the amount of the high cetane fuel.

Also in accordance with the present invention, the combustion period 251 is controlled by the amount of combustion products recirculated into the air provided to cylinder 15. More specifically, the ignition delay 250 is followed by the combustion period 251 during which the combustible mixture burns in cylinder 15 and produces combustion products which expand to power piston 16 and subsequently leave the cylinder as exhaust gases; and the length of the combustion period is controlled by returning a portion of the exhaust gases to the cylinder with the air to form the above-identified gaseous medium containing oxygen.

Further in accordance with the present invention, the power output is controlled by varying the ratio of the total amount of the fuels—which in engines 10, 100, and 200 are provided from respective sources 40 and 44, 120 and 122, or 210 and 211—to the air in the charge provided to the cylinder 15, the same amount of air and recirculated combustion products being provided for each charge in the cylinder. In an engine having a supercharger corresponding to turbocharger 11 of engine 10, the power may be also controlled by varying the amount of air supplied to the cylinder; however, the same amount of air and recirculated combustion products is provided for each charge in the cylinder and the power is controlled by varying the total amount of the fuels provided to the cylinder in the charge.

The requisite amounts of air, fuels, and combustion products are determined by controller 13 from at least the rotational position and speed of crankshaft 17, as provided by sensor 37, and the desired power output, as provided by sensor 38. The controller then actuates the appropriate fuel supply elements—valves 22 and 24 of engine 10, injector 101 and valve 124 of engine 100, or valves 216 and 217 of engine 200—to provide the total amount and ratio of the fuels; actuates the exhaust gas recirculation valve 66 of all of these engines to provide the proper total amount of combustion; and, for engine 10, actuates the waste gate 60 to vary the amount of air supplied.

As a result of this actuation, cylinder 15 is provided with a quantity of the high cetane fuel and a quantity of the low cetane fuel resulting in the desired power output, while the quantity of the relatively high cetane fuel in relation to the quantity of the relatively low cetane fuel results in the ignition delay being appropriate for the crankshaft rotational speed, and while the portion of the products of combustion recirculated results in the combustion period being appropriate for this rotational speed. As before stated, the high cetane fuel is typically a liquid, such as diesel fuel, in the embodiments of engines 10 and 100; and, in these embodiments, the low cetane fuel is a gaseous fuel typified by natural gas.

It will be apparent from the above that, in an engine operating in accordance with the present invention and typified by engine 10, 100, or 200, the engine operates with sequential cycles corresponding to rotation of crankshaft 18. Each cycle has an intake phase—corresponding to angles 50 and 51, angles 108 and 112, or angle 226—in which a combustible mixture is provided in cylinder 15. The intake phase is followed by a compression phase corresponding to angle 250 during which ignition is delayed. It will also be apparent that an effective ignition delay for each cycle is a function of the rotational speed of the crankshaft and of the power provided at each cycle so that, in accordance with the present invention, the power provided by the engine at each cycle is controlled by varying the total amount of the low and high cetane fuels provided in the combustible mixture. Also for each cycle and in accordance with the present invention, there is determined the ratio of the low to cetane fuel to the high cetane fuel giving the effective ignition delay, and there is mixed into the combustible mixture for the cycle an amount of said second fuel giving such ignition delay.

After the above-identified intake phase and ignition delay of each cycle, there follows a combustion phase of the cycle during which the combustible mixture burns and forms products which leave cylinder 15 as exhaust gases during an exhaust phase of the cycle which follows the combustion phase. The desired duration of the combustion phase is a function of the rotational speed of crankshaft 18 and of the power to be provided at each cycle. However, the total amount of the high and low cetane fuels giving the power to be provided by the engine at each cycle results in too short a duration of the combustion phase when the gaseous medium containing oxygen and provided to the cylinder consists substantially of air. Therefore, the duration of the combustion phase is lengthened by mixing into the gaseous medium a portion of the exhaust gases determined by controller 13 and giving the appropriate duration of the combustion phase, this portion being mixed into the gaseous medium by actuation of exhaust gas recirculation valve 66.

In summary, an engine such as engine 10, 100, or 200 is operated in accordance with the present invention by providing each cylinder, such as cylinder 15, with about the same amount of gaseous medium containing oxygen while: first, controlling the ignition delay period 250 by varying the ratio of the amount of the low cetane fuel to the amount of the high cetane fuel, the ignition delay being shortened by decreasing this ratio; second, controlling the length of the combustion period 251 by recirculating a portion of the exhaust gases to the cylinder in the gaseous medium containing oxygen, the length of the combustion period being increased by increasing the portion of the exhaust gases returned to the cylinder; and, third, controlling the power provided by the engine by varying the total amount of the low cetane fuel and the amount of the high cetane fuel mixed into the gaseous medium containing oxygen, the power provided being increased by increasing the total amount of the fuels.

Although the present invention has been described in connection with what are conceived to be practical and preferred embodiments, it is recognized that departures may be made therefrom within the scope of the invention, which is not limited to the illustrative details disclosed.

What is claimed is:

1. A method for operating a homogeneous charge, compression ignition engine, the engine having a cylinder and a piston moveable in the cylinder, and the method comprising the steps of:
   providing in the cylinder a gaseous medium containing oxygen;
   forming a combustible mixture by mixing generally homogeneously into the gaseous medium a first fluid fuel that is relatively difficult to ignite and a second fluid fuel that is relatively easy to ignite; and
   compressing the combustible mixture with the piston until combustion starts generally simultaneously at a plurality of locations distributed throughout the combustible mixture after an ignition delay determined by the proportion of the first fuel to the second fuel.

2. The method of claim 1 wherein the first fuel is gaseous and the second fuel is a liquid having a relatively high cetane number.

3. The method of claim 2 wherein the first fuel is natural gas; the second fuel is a diesel fuel; and the mass of the natural gas in the combustible mixture is at least about ten times the mass of the diesel fuel.

4. A method for operating a homogenous charge, compression ignition engine, the engine having a cylinder and a piston moveable in the cylinder, and the method comprising the steps of:
   providing in the cylinder a gaseous medium containing oxygen;
   forming a combustible mixture by mixing generally homogeneously into the gaseous medium a first fluid fuel that is relatively difficult to ignite and a second fluid fuel that is relatively easy to ignite;
   compressing the combustible mixture with the piston until combustion starts generally simultaneously at a plurality of locations distributed throughout the combustible mixture after an ignition delay determined by the proportion of the first fuel to the second fuel; and
   wherein the ignition delay begins when the piston is at a predetermined rotational position relative to top dead center and wherein the method further comprises the step of controlling the ignition delay by varying the ratio of the amount of the first fuel to the amount of the second fuel.

5. The method of claim 4 wherein the method further comprises shortening the ignition delay by decreasing the ratio of the amount of the first fuel to the amount of the second fuel.

6. The method of claim 5 wherein the engine operation cycle includes an intake phase, a compression phase, a combustion phase and an exhaust phase; said combustion phase including an ignition delay that is a function of engine speed and engine power at each cycle; and wherein the method further comprises the steps of:
   controlling the power provided by the engine at each cycle by varying the total amount of the first fuel and the second fuel provided in the combustible mixture;
   determining for each cycle the ratio of the first fuel to said second fuel giving said effective ignition delay; and
   mixing into the combustible mixture for the cycle an amount of said second fuel giving said required ignition delay.

7. The method of claim 6 further comprising the step of providing about the same amount of said gaseous medium containing oxygen to the cylinder at each cycle as the power provided by the engine at each cycle is controlled by varying the total amount of the first fuel and the second fuel provided to the cylinder at each cycle.

8. The method of claim 6 wherein the engine includes a supercharger controllable to increase the amount of said gaseous medium containing oxygen provided to the cylinder at each cycle, and wherein the method further comprises increasing the power provided by the engine at each cycle by controlling the supercharger to increase the amount of said gaseous medium containing oxygen provided to the cylinder at each cycle.

9. The method of claim 8 further comprising providing about the same amount of said gaseous medium containing oxygen to the cylinder at each cycle as the power provided by the engine at each cycle is controlled by varying the total amount of the first fuel and the second fuel provided to the cylinder at each cycle.

10. The method of claim 6 wherein the method further comprises the step of recirculating a portion of exhaust gases into said gaseous medium to control the duration of the combustion phase.

11. A method of operating an engine, comprising the steps of:
   mixing a first fuel, a second fuel and oxygen in a cylinder when a piston is closer to a bottom dead center position than to a top dead center position;

adjusting an ignition delay at least in part by providing the first fuel and the second fuel to the cylinder in a determined proportion;

compression igniting the mixture when the piston is closer to the top dead center position than the bottom dead center position.

12. The method of claim 11 wherein said mixing step includes a step of injecting liquid fuel from a fuel injector directly into the cylinder.

13. The method of claim 11 wherein said mixing step includes a step of routing a gaseous fuel into the cylinder.

14. The method of claim 11 wherein said mixing step includes a step of providing compressed air to the cylinder.

15. The method of claim 11 wherein said adjusting step includes a step of enlarging said ignition delay at least in part by reducing a proportion of fuel with a high cetane number relative to fuel with a low cetane number.

16. The method of claim 11 wherein said adjusting step includes a step of reducing said ignition delay at least in part by increasing a proportion of fuel with a high cetane number relative to fuel with a low cetane number.

17. The method of claim 11 including a step of adjusting combustion duration at least in part by recirculating exhaust gases into the cylinder.

18. An engine comprising;

an engine housing with at east one cylinder;

a piston slidably positioned in each said at least one cylinder, and being movable between a bottom dead center position and a top dead center position;

a liquid fuel supply valve attached to said engine housing;

a gaseous fuel supply valve attached to said engine housing;

a controller in control communication with said fuel injector and said gaseous fuel supply valve, and being operable to actuate said fuel injector when said piston is closer to said bottom dead center position than said top dead center position.

19. The engine of claim 18 wherein said fuel injector includes a nozzle tip located in said cylinder.

20. The engine of claim 18 including an exhaust gas recirculation system attached to said engine housing.

21. The engine of claim 18 including a turbocharger operably coupled to said cylinder.

22. The engine of claim 18 wherein said controller includes an ignition delay adjuster operable to determine an adjustment to a proportion of a liquid fuel to a gaseous fuel supplied to said cylinder.

* * * * *